July 6, 1926.

T. B. LUNDIN 1,591,169

MACHINE FOR MEASURING AND SUPPLYING MATERIALS TO CARTONS

Filed March 9, 1923    5 Sheets-Sheet 1

Inventor
Trued B. Lundin
by his Attorney

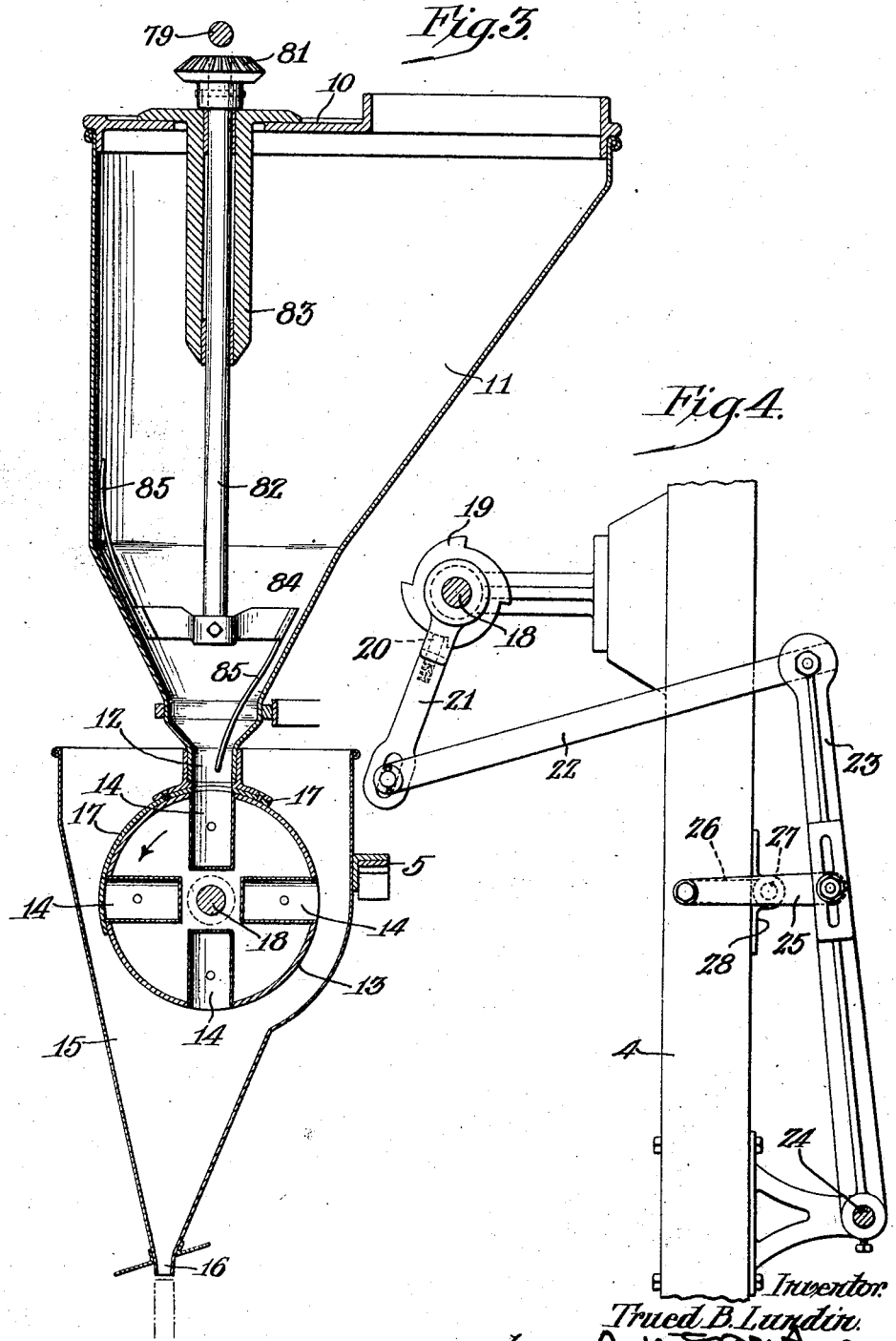

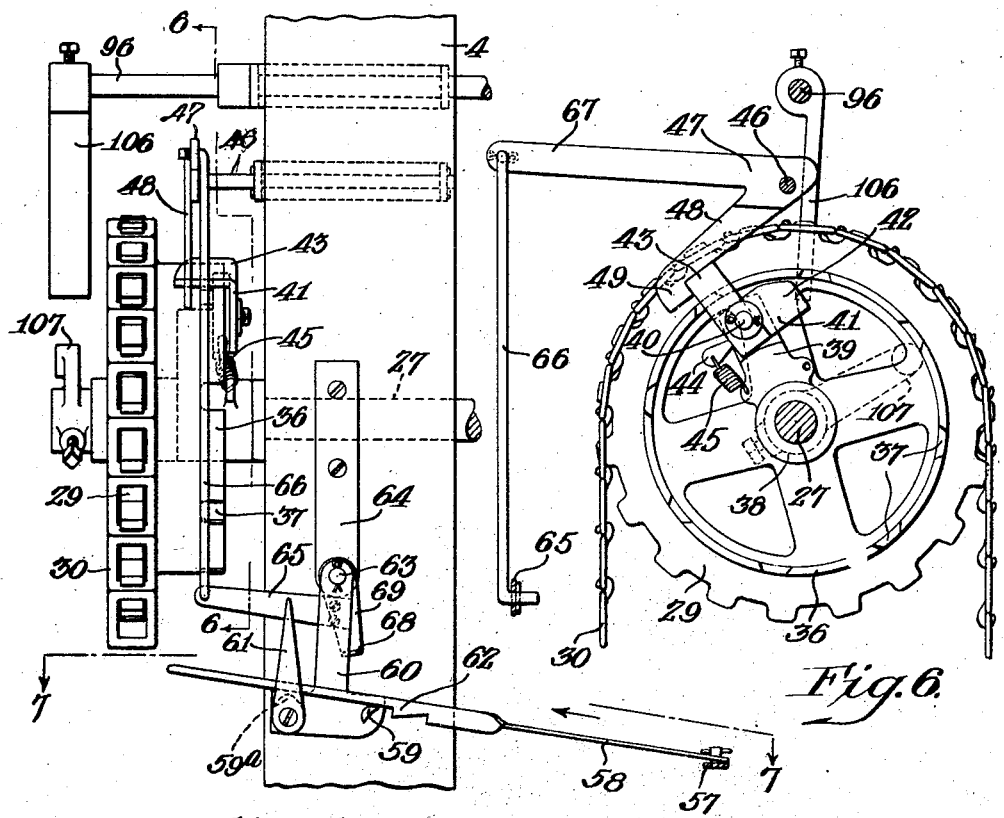
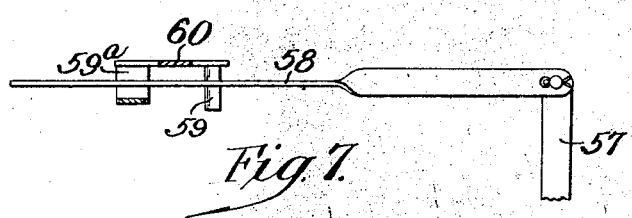

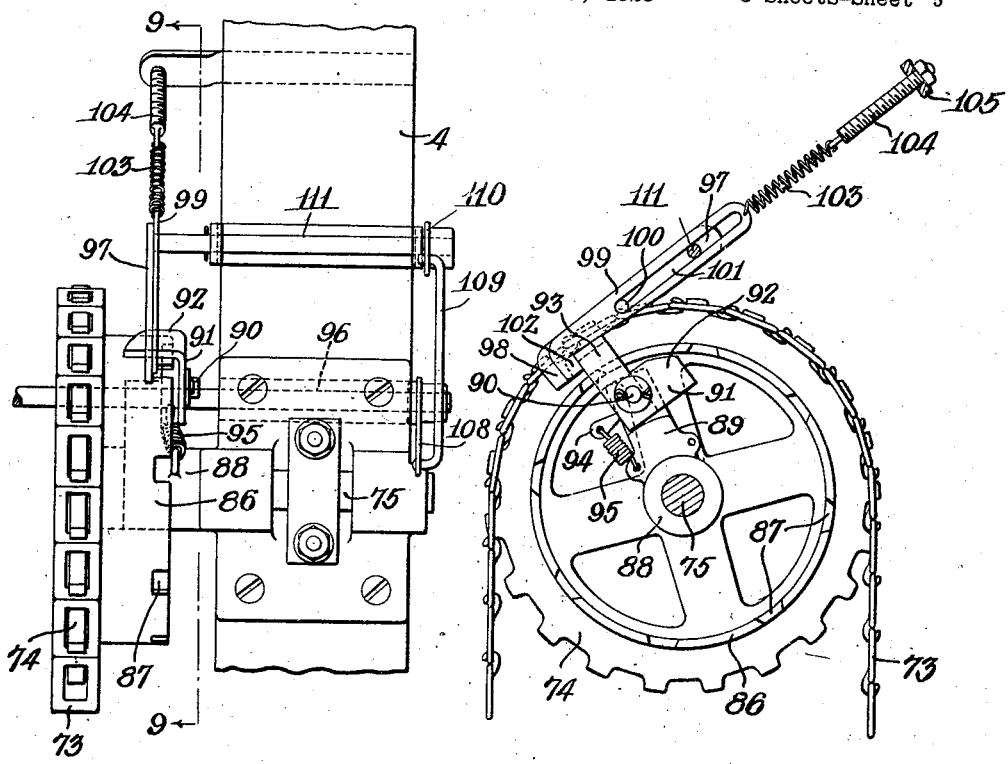

Patented July 6, 1926.

1,591,169

UNITED STATES PATENT OFFICE.

TRUED B. LUNDIN, OF PHILADELPHIA, PENNSYLVANIA, ASSIGNOR TO AMERICAN MACHINERY CO., INC., OF PHILADELPHIA, PENNSYLVANIA, A CORPORATION OF DELAWARE.

MACHINE FOR MEASURING AND SUPPLYING MATERIALS TO CARTONS.

Application filed March 9, 1923. Serial No. 623,897.

This invention relates to improvements in machines for measuring and supplying materials to cartons and other receptacles. The object of the invention is to provide a novel, simple and efficient construction and organization of mechanism: first, whereby normally idle mechanism may be connected to a constantly rotating wheel by a trip device to measure material from a hopper and introduce it to a receptacle or carton each time a receptacle or carton is placed at a receiving station and the trip device is operated; second, whereby a normally idle stirrer within the hopper may be actuated automatically each time the measuring and introducing mechanism is actuated; third, whereby the trip device for controlling the said normally idle mechanism and the stirrer may be controlled and operated by the receptacles or cartons to be filled as they are advanced by a suitable carrier into and from a receiving station; fourth, whereby various advantageous results are obtained.

With the foregoing and related objects in view, the invention consists in the novel construction, combination and arrangement of parts hereinafter described and claimed.

In the accompanying drawings, illustrating my invention,

Figure 3 is a vertical section through the feed hopper and measuring wheel, on line 3—3 of Fig. 1.

Figure 4 is a sectional detail showing part of the mechanism for actuating the measuring wheel.

Figure 5 is a front view of the trip device and adjuncts for controlling the operation of the measuring wheel and stirrer.

Figure 6 is a sectional detail of the parts shown in Fig. 5, on line 6—6 of Fig. 5.

Figure 7 is a horizontal section on line 7—7 of Fig. 5, showing certain levers and connections for operating the trip device shown in Fig. 5.

Figure 8 is a front view of the trip device and adjuncts for controlling the operation of the stirrer.

Figure 9 is a sectional detail of the parts shown in Fig. 8, on line 9—9 of Fig. 8.

Figure 1:
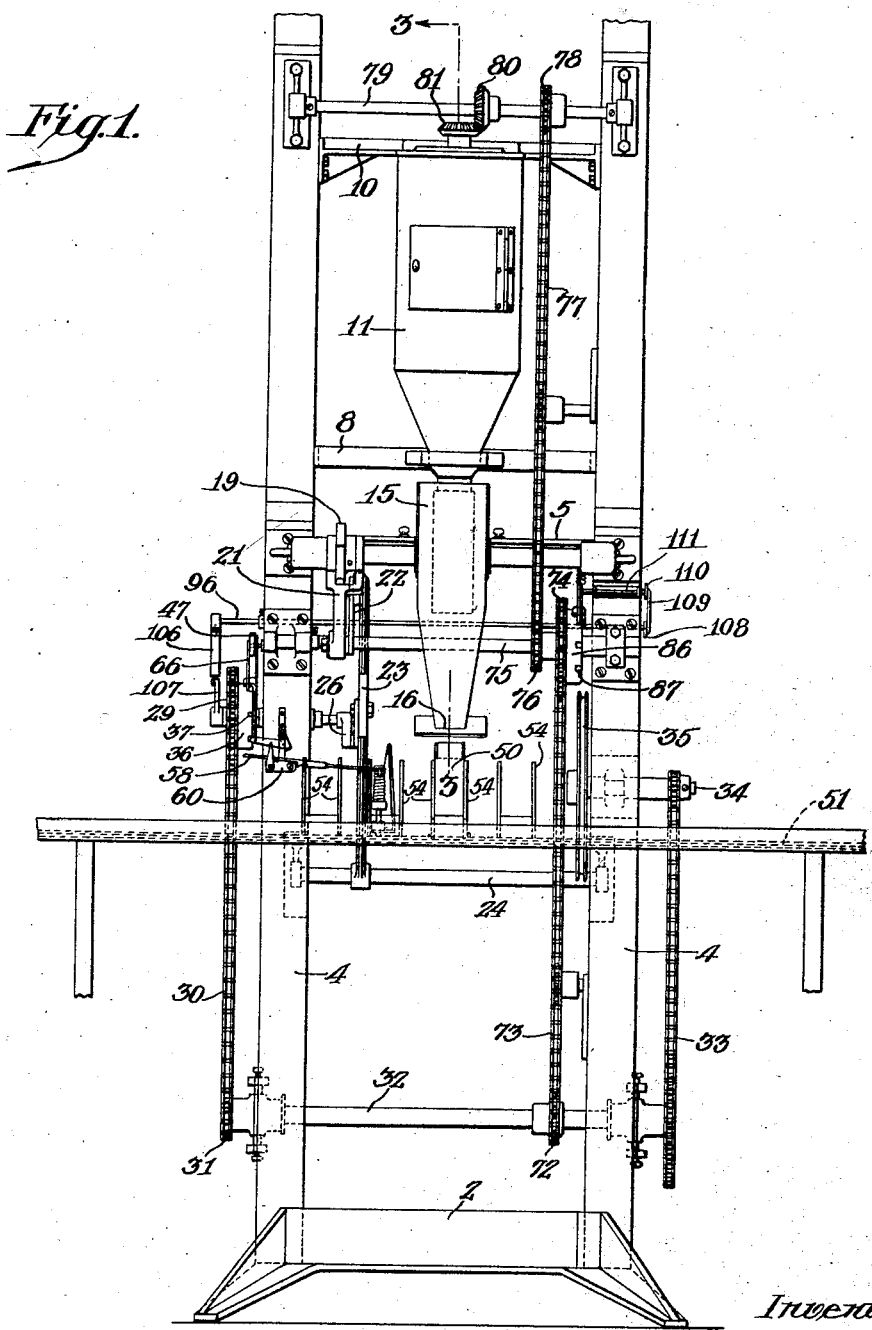
Figure 1 is a front elevation of a machine embodying my invention.
Figure 2:
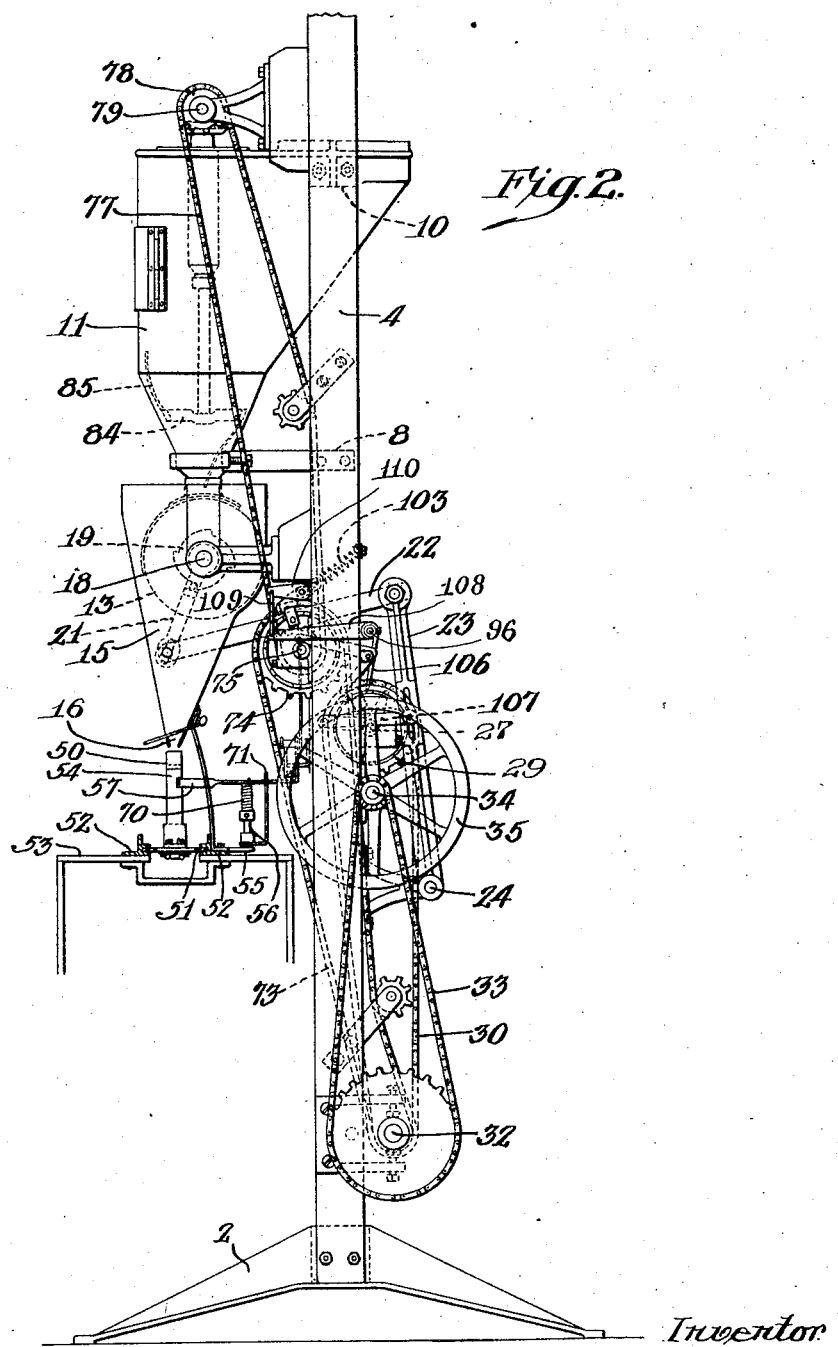
Figure 2 is a side elevation thereof, partly in section.

Referring to the drawings, the supporting or main frame of the machine, as generally stated, comprises a base 2, a pair of spaced, parallel, standards 4 secured to and rising from the base, and transverse bars 5, 8 and 10 connecting the standards 4 above the base 2.

Extending between and supported by the frame bars 8 and 10 is a hopper 11 adapted to contain material in powdered or other loose form to be introduced to containers or cartons. The hopper 11 is shaped as shown in the drawings, having downwardly converging or tapered walls which terminate in a tubular bottom portion forming a discharging spout 12.

Beneath the discharging spout 12 of the hopper is a measuring wheel 13 having a circular series of radially-arranged measuring chambers 14 which are open at their outer ends and which are adapted to be brought successively into registry with the spout 12 to receive material from the hopper 11. The measuring wheel 13 is enclosed by an auxiliary hopper or receiver 15 having a discharge spout 16 at the bottom thereof and being adapted to receive the contents of the chambers 14, successively, and discharge the same through the spout 16.

The measuring wheel 13 is rotated step by step in the direction of the arrow, and at each step it is moved a quarter revolution. Each time the wheel 13 is moved one step, a chamber 14 is moved into a receiving position in registry with the spout 12 and receives material from the hopper 11; and each time the wheel 13 is moved one step, a chamber 14 is moved into a discharging position in which it is inverted directly below the chamber 14 in the receiving position, to discharge the contents of the chamber into the hopper 15. As each chamber 14 is moving from the receiving position to the horizontal position intermediate the receiving and discharging positions, the outer end of the chamber is closed by a curved wall 17 secured to and extending from the hopper 11. This wall 17 is fitted against the periphery of the wheel 13 and extends from the spout 2 on each side of a chamber 14 when it is in the receiving position and serves to cut off the supply of material from the hopper 11 as each chamber 14 leaves the receiving position, and it also serves to close all portions of the outer end of each chamber 14 not open to the spout 12 as each chamber 14 comes into registry with the spout.

The measuring wheel 13 is secured to and carried by a horizontal shaft 18 which extends through the walls of the hopper 15 and supports the same, and which is fitted to turn in suitable bearings on the standards 4. The hopper 15 is additionally supported by the frame bar 5 to which it is secured. The shaft 18 is provided with a ratchet wheel 19 having teeth which correspond in number with the measuring chambers 14 and which are adapted to be engaged by a reciprocative, spring pressed, pin or pawl 20 fitted to work within a guide opening in an arm 21 which is pivoted at one end on the shaft 18. The other end of the arm 21 is connected by a pitman 22 to the upper end of an arm 23 whose lower end is pivoted on a shaft 24 which extends between and is supported by suitable bearings on the standards 4. The arm 23 is connected by a pitman 25 to a crank 26 on the inner end portion of a shaft 27 which is fitted to rotate in a bearing 28 on one of the standards. The ratchet wheel 19 and its pawl 20 and parts connecting the pawl carrying arm 21 and crank 26 are arranged to move the arm 21 back and forth and cause the measuring wheel 13 to be rotated step by step when the shaft 27 is rotated, turning the measuring wheel a quarter revolution, or one step, each time the shaft 27 is turned a complete revolution.

The outer end portion of the shaft 27 has a sprocket wheel 29 loosely mounted thereon and adapted to be driven constantly by a chain 30 passing around the same and a similar wheel 31 on a shaft 32 which turns in bearings on the standards 4. The shaft 32 is driven by a chain and sprocket connection 33 with a shaft 34 which turns in a bearing on one of the standards 4 and which is provided with a pulley 35 by means of which the shafts 34 and 32 may be driven constantly from a suitable motor or source of power.

The sprocket wheel 29 is provided with an annular flange 36 which extends laterally therefrom and which is provided with a circular series of spaced notches 37. Secured to the shaft 27 adjacent to the sprocket wheel 29 is a collar 38 provided with a projecting arm 39. Fulcrumed, at 40, on the arm 39 is a clutch lever 41 having one arm 42 located within the sprocket wheel flange 36 and another arm 43 which extends outwardly beyond the periphery of the flange 36 and then parallel with the axis of the shaft 27 across the outer surface of the flange 36. The lever 41 is provided with a projection 44 which is connected by a spring 45 to the arm 39. The spring 45 acts to press the lever arm 42 toward the inner surface of the flange 36, so that, when the lever 42 is free to move in that direction, the arm 42 will enter one of the notches 37 of the flange 36 and cause the collar 38 and shaft 27 to rotate with the sprocket wheel 29, until the lever 41 is moved against the action of the spring 45, as hereinbefore explained, to disengage the arm 42 from the notch 37 in the flange 36, whereupon the shaft 27 will cease to rotate, and the sprocket wheel 29 will turn idly thereon.

Fulcrumed, at 46, on a bracket on one of the standards 4 is a lever 47 having an arm 48 provided on its free end with a hook 49 which is adapted to engage the clutch lever arm 43 and which rests upon the sprocket wheel flange 36 when the clutch lever 41 is rotating with the sprocket wheel 29. When the hook 49 is engaged with the clutch lever arm 43, as clearly shown in Fig. 6, the lever arm 42 is held away from the notches 37 in the rotating flange 36; and, when it is desired to actuate the shaft 27 by the sprocket wheel 36, the lever 47 is raised to disengage the hook 49 from the clutch lever arm 43 and permit the spring 45 to move the lever arm 42 into engagement with one of the flange notches 37, causing the shaft 27 to be rotated by and with the sprocket wheel 36. After the lever 47 has been raised to start the rotation of the shaft 27, it is permitted to drop by gravity and rest upon the flange 36 until its hook 49 is re-engaged by the lever arm 43. When the lever arm 43 re-engages the hook 49 the lever arm 42 is moved from engagement with a notch 37 in the flange 36 and the rotation of the shaft 27 is stopped after it has been turned a complete revolution by the sprocket wheel 29.

It will now be understood that the lever 47 and its associated parts forms a trip device which may be operated or raised by hand or by suitable mechanism to free the clutch lever arm 43 and then released to free the lever 47 and permit its hook 49 to rest upon the flange 36, and that each time the clutch device is thus operated the shaft 27 will be turned one complete revolution by the constantly rotating sprocket wheel 29. It will also be understood that each time the trip lever is operated, the turning of the shaft 27 will turn the crank 26 one complete revolution and thereby turn the measuring wheel 13 one step, causing one of its chambers 14 to receive a charge of material from the hopper 11, and causing one of its chambers 14 to discharge its contents into the hopper 15.

As measured quantities of material from the hopper 11 are thus successively discharged from the chambers 14 by successive operations of the trip lever 47, the measured quantities of material are successively received by and discharged from the hopper 15 through its spout 16; and, prior to the discharge of each measured quantity of material from the hopper 15, a suitable receptacle or carton 50 is placed beneath the spout 16 to receive the material. The receptacles 50 may be placed beneath the spout 16 by hand or they may be placed in spaced relation upon a suitable chain or carrier 51 which may be operated intermittently by hand or by power to move the cartons into and from the charging station beneath the spout 16, permitting each carton to rest at the charging station long enough to receive a charge of material. The carrier 51 is fitted to slide in guideways in parallel bars 52 which are mounted on a table 53 which is suitably supported forwardly of the standards 4. The carrier 51 is provided with spaced pairs of upwardly projecting plates 54 between which the cartons 50 are placed by hand.

When the carrier 51 is employed to move the cartons 50 successively to the charging station, I utilize the carrier 51 to operate a mechanism which automatically operates the trip lever 47 each time a carton is moved into the charging station, as follows: Projecting upwardly from a bracket 55 on the table 53 is a post 56 forming the fulcrum of a horizontal lever 57 supported on the upper end of the post. The forward arm of the lever 57 extends into the path of the carrier plates 54, and the rearward arm of the lever 57 is pivoted to one end portion of a light bar 58. The other end portion of the bar 58 rests upon a lug 59 on a lever 60 and is held in place thereon between the body of the lever 60 and a projection 61 thereon. The bar 58 is provided with a tooth 62 which is adapted to engage the lug 59 and move the lever 60 with the bar 58. The lever 60 is pivoted, at 63, to a bracket 64 on one of the standards 4 and it is provided with a projection 65 which is connected by a link 66 to the forwardly projecting arm 67 of the trip lever 47. Each time the carrier 51 is operated to move a carton 50 into the charging station a pair of carrier plates 54 is moved past the forward arm of the lever 57, and when the carrier 51 is thus operated, the plates 54 engage the lever 57 and cause it to operate the bar 58, lever 60 and link 66 to raise the trip lever 47 to free the clutch lever 41, and, immediately thereafter, the part 59ª engages a bar 58 and raises its tooth 62 from the lug 59 and permits the trip lever 47 to drop by gravity and rest upon the sprocket wheel flange 36. When the tooth 62 escapes the lug 59, the lever 60 drops back by gravity against a stop 68 projecting from an arm 69 on the bracket 64; and, after the lever 57 escapes the pair of carrier plates 54 moving past it, a spring 70 encircling the post 56 and having one end engaged with the lever 57 and the other end engaged with a collar on the post 56, returns the lever 57 to normal position against a stop arm 71 on the bracket 55 for a succeeding operation.

The driving shaft 32, previously referred to, has a sprocket wheel 72 secured thereto which is geared by a chain 73 to a similar wheel 74 turning loosely on a shaft 75 which is mounted to turn in bearings on the standards 4 and which is normally idle. The sprocket wheel 74 is driven constantly when power is applied to the driving pulley 35; and, by mechanism presently explained, the sprocket wheel 74 is adapted to be periodically connected to the shaft 75 to turn it and a sprocket wheel 76 fixed thereon adjacent to the wheel 74. The sprocket wheel 76 is connected by a chain 77 to a similar wheel 78 on a horizontal shaft 79 which extends across the top of the hopper 11 and turns in bearings on the standards 4. The shaft 79 has a mitre gear 80 fixed thereon in mesh with a similar gear 81 on the upper end of a vertical shaft 82 which extends down into the hopper 11 and turns in a bearing 83 carried by the frame bar 10. The lower end portion of the shaft 82 carries a stirrer 84 having projecting arms 85 which, when the shaft 82 is rotated, stirs or agitates the material within the hopper 11 and causes it to feed freely by gravity down through the spout 12.

When the sprocket wheel 74 is connected to the shaft 75, the stirrer 84 is rotated by the gearing connecting it to the shaft 75, and I shall now describe the means for periodically connecting the constantly rotating sprocket wheel 74 and the normally idle shaft 75.

The sprocket wheel 74 is provided with an annular flange 86 which extends laterally therefrom and which is provided with a circular series of spaced notches 87. Secured to the shaft 75 adjacent to the sprocket wheel 74 is a collar 88 provided with a projecting arm 89. Fulcrumed, at 90, on the arm 89 is a clutch lever 91 having one arm 92 located within the sprocket wheel flange 86 and another arm 93 which extends outwardly beyond the periphery of the flange 86 and then parallel with the axis of the shaft 75 across the outer surface of the flange 86. The lever 91 is provided with a projection 94 which is connected by a spring 95 to the arm 89. The spring 95 acts to press the lever arm 92 toward the inner surface of the flange 86, so that, when the lever arm 92 is free to move in that direction, the arm 92 will enter one of the notches 87 of the flange 86 and cause the collar 88 and shaft 75 to rotate with the sprocket wheel 74, until the lever 91 is moved against the action of the spring 95, as hereinbefore explained, to disengage the arm 92 from the notch 87 in the flange 86, whereupon the shaft 75 will cease to rotate, and the sprocket wheel 74 will turn idly thereon.

Mounted to turn in bearings on the standards 4 is a rock shaft 96 having an arm 108 connected by a link 109 to an arm 110 on a short rock shaft 111 which turns in a bracket on one of the standards 4 so that when the shaft 96 is rocked, the shaft 111 will be rocked also. The shaft 111 carries an arm 97 provided on its free end with a hook 98 which is adapted to engage the clutch lever arm 93 and which rests upon the sprocket wheel flange 86 when the clutch lever 91 is rotating with the sprocket wheel 74. Adjacent to the arm 97 is a longitudinally movable plate 99 guided and supported by the shaft and a pin 100 projecting from the arm 97 and into a slot 101 in the plate 99. One end of the plate 99 has a hook 102 thereon which is adapted to engage the lever arm 93. The plate 99 is movable longitudinally of the arm 97 and it is held normally in the position shown in Fig. 9 by a spring 103 having one end attached to the plate 99 and the other end attached to a screw 104 carried by an arm 105 projecting from one of the standards 4. The spring 103 holds the hook 102 normally spaced a slight distance from the hook 98 and the plate 99 is movable against the action of the spring 103 to bring the hooks 98 and 102 into registry.

In the normal position of the parts, as shown in Fig. 9, the hook 102 is engaged with the clutch lever arm 93 and the lever arm 92 is thereby held away from the notches 87 in the rotating flange 86; and, when the shaft 96 is rocked to raise the arm 97 and hook 98 and therewith the plate 99 and hook 102 from the flange 86, the spring 95 is permitted to move the lever arm 92 into engagement with one of the flange notches 87, causing the shaft 75 to be rotated by and with the sprocket wheel 74. After the arm 97 and plate 99 have been raised to start the rotation of the shaft 75, they are permitted to drop by gravity and rest upon the flange 86 until the hooks 98 and 102 are engaged by the lever arm 93. When the lever arm 93 engages the hooks 98 and 102 it moves the hook 102 against the action of the spring 103 until the arm 93 is stopped by the hook 98 and the hook 98 then causes the lever arm 92 to move from engagement with a notch 87 in the flange 86 and stop the rotation of the shaft 75 after it has been turned a complete revolution by the sprocket wheel 74. After the rotation of the shaft 75 has been thus stopped, the spring 103, being stronger than the spring 95, moves the hook 102 back from the hook 98 to the position shown in Fig. 9 and thereby moves the lever arm 92 from actual contact with the flange 86 and prevents the noise which would occur if the parts connected to the shaft 75 were permitted to hold the arm 91 in engagement with the flange 86.

The end of the shaft 96 opposite to the end thereof carrying the arm 108, carries an arm 106 which rests in the path of an arm 107 carried by the normally idle shaft 27, which is controlled by the trip lever 47 hereinbefore described. The arms 106 and 107 are so related that just before the shaft 27 completes each revolution, after being set in motion by the operation of the trip lever 47, the arm 107 engages the arm 106 and rocks the shaft 96 and raises the hooks 98 and 102 from the clutch lever arm 93 and thus starts the rotation of the shaft 75 and, immediately thereafter, the arm 107 escapes the arm 106 and permits the arm 97 to drop back by gravity until the hooks 98 and 102 rest upon the flange 86 to engage the lever arm 93 and stop the rotation of the shaft 75 after it has been turned a complete revolution, as previously explained.

It will now be understood that the arm 106 and parts operated thereby form a trip device which is under the control of the trip lever 47 and which is operated automatically to rotate the stirrer 84 for a limited period of time each time one of the chambers 14 of the measuring wheel 13 is in the receiving position in registry with the spout 12 to ensure the filling of the chambers from the hopper 11.

I claim as my invention:—

1. The combination of a supporting frame, a normally idle measuring wheel having a series of measuring chambers arranged to be moved successively into receiving and discharging positions when the wheel is turned step by step, a hopper for introducing material to said chambers successively when they are in the receiving position, a normally idle stirrer within the hopper, a driving wheel adapted to be rotated constantly, gearing between said measuring wheel and said driving wheel, a trip device operable to connect said driving wheel and said gearing to move the measuring wheel one step and to automatically disconnect the driving wheel and the gearing following the movement of the measuring wheel one step, and mechanism controlled by said trip device to automatically actuate the stirrer for a given period of time each time the trip device is operated to actuate the measuring wheel.

2. The combination of a supporting frame, a normally idle measuring wheel having a series of measuring chambers arranged to be moved successively into receiving and discharging positions when the wheel is turned step by step, a hopper for introducing material to said chambers successively when they are in the receiving position, a normally idle stirrer within the hopper, two driving wheels, means operable to rotate said wheels constantly, gearing between said measuring wheel and one of said driving wheels, gearing between said stirrer and the other of said driving wheels, a trip device operable to connect one of said driving wheels and its gearing, and a trip device operated automatically by the gearing controlled by the first named trip device to connect the other of said driving wheels and its gearing, said trip devices automatically disconnecting their driving wheels and their gearings after their gearings have been actuated given periods of time, respectively.

3. The combination of a supporting frame, a measuring device having a measuring chamber movable to receiving and discharging positions, means to introduce material to the chamber when it is in the receiving position, means to support a series of receptacles and operable to move them successively into and from a receiving station to receive material from said chamber when it is in its discharging position, a driving wheel adapted to be rotated constantly, gearing between said measuring device and said wheel, and a trip device adapted to be operated by said receptacles successively as they are moved by their supporting means to connect said wheel and said gearing to move the chamber of the measuring device from the receiving to the discharging position and to automatically disconnect said wheel and said gearing when the chamber reaches the discharging position.

4. The combination of a supporting frame, a normally idle measuring wheel having a series of measuring chambers arranged to be moved successively into receiving and discharging positions when the wheel is turned step by step, means to introduce material to said chambers successively when they are in the receiving position, means to support a series of receptacles and operable to move them successively into and from a receiving station to receive material from said chamber when it is in its discharging position, a driving wheel adapted to be rotated constantly, gearing between said measuring device and said wheel, and a trip device adapted to be operated by said receptacles successively as they are moved by their supporting means to connect said driving wheel and the gearing to move the measuring wheel one step and to automatically disconnect the driving wheel and the gearing following the movement of the measuring wheel one step.

5. The combination of a supporting frame, a normally idle measuring wheel having a series of measuring chambers arranged to be moved successively into receiving and discharging positions when the wheel is turned step by step, means to support a series of receptacles and operable to move them successively into and from a receiving station to receive material from said chamber when it is in its discharging position, a hopper for introducing material to said chambers successively when they are in the receiving position, a normally idle stirrer within the hopper, a driving wheel adapted to be rotated constantly, gearing between said measuring wheel and said driving wheel, a trip device adapted to be operated by said receptacles successively as they are moved by their supporting means to connect said driving wheel and the gearing to move the measuring wheel one step and to automatically disconnect the driving wheel and the gearing following the movement of the measuring wheel one step, and mechanism controlled by said trip device to automatically actuate the stirrer for a given period of time each time the trip device is operated to actuate the measuring wheel.

6. The combination of a supporting frame, a carrier to support a series of receptacles and operable to move them successively into and from a receiving station, a hopper to contain material to be introduced to the receptacle, a normally idle stirrer within the hopper, a normally idle transfer device to transfer material from the hopper to the receptacles successively when they are at the receiving station, and means controlled by the carrier to periodically actuate said stirrer and said transfer device as the carrier is operated to move the receptacles successively to the receiving station.

In testimony whereof I affix my signature hereto.

TRUED B. LUNDIN.